United States Patent
Shin et al.

(10) Patent No.: US 10,293,701 B2
(45) Date of Patent: May 21, 2019

(54) CONTROL METHOD AND SYSTEM OF LOW-VOLTAGE DC-DC CONVERTER FOR HYBRID VEHICLE

(71) Applicant: Hyundai Motor Company, Seoul (KR)

(72) Inventors: Dong Jun Shin, Gyeonggi-do (KR); Ho Joong Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 321 days.

(21) Appl. No.: 15/217,269

(22) Filed: Jul. 22, 2016

(65) Prior Publication Data

US 2017/0291499 A1  Oct. 12, 2017

(30) Foreign Application Priority Data

Apr. 11, 2016 (KR) .................. 10-2016-0044127

(51) Int. Cl.
 *B60L 11/18* (2006.01)
 *H02J 7/00* (2006.01)

(52) U.S. Cl.
CPC ......... *B60L 11/1851* (2013.01); *B60L 11/187* (2013.01); *B60L 11/1861* (2013.01); *H02J 7/0029* (2013.01); *B60L 2210/10* (2013.01); *Y02T 10/7005* (2013.01); *Y02T 10/705* (2013.01); *Y02T 10/7044* (2013.01); *Y02T 10/7216* (2013.01)

(58) Field of Classification Search
None
See application file for complete search history.

(56) References Cited

U.S. PATENT DOCUMENTS

| | | | |
|---|---|---|---|
| 2014/0077620 A1* | 3/2014 | Nobusawa | B60R 16/03 307/112 |
| 2016/0084916 A1* | 3/2016 | Kim | G01R 31/3675 324/431 |
| 2016/0303976 A1* | 10/2016 | Cha | B60L 3/0046 |
| 2017/0008408 A1* | 1/2017 | Park | B60L 11/1861 |
| 2017/0261473 A1* | 9/2017 | Sung | B60L 11/1851 |

FOREIGN PATENT DOCUMENTS

| | | |
|---|---|---|
| JP | 2003/189401 A | 7/2003 |
| JP | 2004-003460 A | 1/2004 |
| JP | 2010-035350 A | 2/2010 |
| KR | 10-2006-0105470 | 10/2006 |
| KR | 10-2013-0011293 A | 1/2013 |
| KR | 10-2013-0082360 A | 7/2013 |
| KR | 10-1449266 | 10/2014 |
| KR | 10-2016-0053504 A | 5/2016 |

\* cited by examiner

*Primary Examiner* — Jared Fureman
*Assistant Examiner* — Aqeel H Bukhari
(74) *Attorney, Agent, or Firm* — Mintz Levin Cohn Ferris Glovsky and Popeo, P.C.; Peter F. Corless

(57) ABSTRACT

A method of controlling a low-voltage DC-DC converter for a hybrid vehicle is provided. The method includes determining whether an intelligent battery system fails and analyzing a failure cause of the intelligent battery system when the intelligent battery system is determined to fail. A first voltage is deduced using a battery temperature when the failure cause is determined to be a detection failure of battery SOC and an output voltage of a low-voltage DC-DC converter is adjusted to be the first voltage.

10 Claims, 2 Drawing Sheets

CONTROL METHOD AND SYSTEM OF LOW-VOLTAGE DC-DC CONVERTER FOR HYBRID VEHICLE

CROSS REFERENCE TO RELATED APPLICATION

The present application claims priority of Korean Patent Application No. 10-2016-0044127 filed on Apr. 11, 2016, the entire contents of which is incorporated herein for all purposes by this reference.

BACKGROUND

Field of the Invention

The present invention relates to a control method and a system of a low-voltage DC-DC converter for a hybrid vehicle that improve vehicle fuel efficiency by differently controlling a battery charging voltage using a low-voltage DC-DC converter based on failure causes of a battery.

Description of the Related Art

In a broad sense, general hybrid vehicles refer to vehicles driven by two or more different types of power sources which are efficiently combined. However, many hybrid vehicles refer to vehicles, each being driven by an engine (an internal combustion engine), the torque of which is obtained by combustion of fuel (fossil fuel such as gasoline), and by an electric motor, the torque of which is obtained through the electric power of a battery, and they are referred to as hybrid electric vehicles (HEVs).

In recent years, to meet the demands for improving fuel efficiency and developing eco-friendly products, research on hybrid electric vehicles have been conducted. The hybrid vehicle is equipped with a main battery for providing an electric motor with electric power to drive the vehicle, and an auxiliary battery for providing vehicle electric parts with electric power. The auxiliary battery is connected to a low-voltage direct current-direct current (DC-DC) converter (LDC) which converts output between high voltage and low voltage. In other words, the LDC of the hybrid vehicle is a device that operates as an alternator of an existing typical vehicle, and mainly functions to supply voltage to an electric load and to convert a direct current (DC) high voltage from a high-voltage battery into a DC low voltage to charge an auxiliary battery.

A system of the related art discloses that an auxiliary battery, i.e. a low-voltage battery is charged at high energy efficiency. However, this technology is applied to a system and a control method when both of an LDC and a battery are normal, but does not assume particular circumstances such as when the battery or LDC is abnormal. Therefore, the issue is how to control the hybrid vehicle system in the above circumstances.

The foregoing is intended merely to aid in the understanding of the background of the present invention, and is not intended to mean that the present invention falls within the purview of the related art that is already known to those skilled in the art.

SUMMARY

Accordingly, the present invention provides a control method and a system of a low-voltage DC-DC converter for a hybrid vehicle, capable of improving vehicle fuel efficiency in which, when abnormality of a battery is detected, the charging voltage of the battery is differently applied based on results of analyzing the causes of abnormality.

In accordance with one aspect of the present invention, a method of controlling a low-voltage DC-DC converter for a hybrid vehicle may include determining whether an intelligent battery system fails by a controller, analyzing a failure cause of the intelligent battery system by the controller when the intelligent battery system is determined to fail, deducing a first voltage using a battery temperature by the controller when the failure cause is determined to be a detection failure of battery state of charge (SOC), and adjusting an output voltage of a low-voltage DC-DC converter by the controller to be the first voltage. The first voltage may be deduced or determined using map data in which the battery temperature is set as input and the first voltage is set as output.

The method may further include, after the analyzing a failure cause, determining that the failure cause is the detection failure of battery SOC by the controller when the intelligent battery system is determined to fail due to poor connection of a battery terminal. The method may further include, after the analyzing a failure cause, determining that the failure cause is the detection failure of battery SOC by the controller when the intelligent battery system is determined to fail due to an excessive dark current in a battery.

Additionally, the method may include, after the analyzing a failure cause, determining that the failure cause is the detection failure of battery SOC by the controller when the intelligent battery system is determined to fail due to a transmission failure of detected state information of a battery, and adjusting the output voltage of the low-voltage DC-DC converter by the controller to be a predetermined second voltage in response to determining that the intelligent battery system itself fails. The second voltage may be greater than a rated voltage of the battery.

The method may further include, after the analyzing a failure cause, deducing a third voltage using the battery temperature and output power of the low-voltage DC-DC converter by the controller when the failure cause is determined to be the detection failure of battery SOC, and adjusting the output voltage of the low-voltage DC-DC converter by the controller to be the third voltage. The third voltage may be deduced using map data in which the battery temperature and the output power of the low-voltage DC-DC converter may be set as input and the third voltage may be set as output.

In accordance with another aspect of the present invention, a low-voltage DC-DC converter system for a hybrid vehicle may include a battery, a low-voltage DC-DC converter configured to output a charging voltage of the battery, an intelligent battery system configured to detect state information of the battery, and a controller configured to determine whether the intelligent battery system fails, to analyze a failure cause of the intelligent battery system when the intelligent battery system is determined to fail, and to deduce a first voltage using a battery temperature to adjust the first voltage to be an output voltage of the low-voltage DC-DC converter when the failure cause is determined to be a detection failure of battery SOC. The battery temperature may be detected by the intelligent battery system.

In the related art, when the battery is determined to be abnormal regardless of the failure cause of the battery, the output voltage of the low-voltage DC-DC converter is adjusted to be a high value and thus, the battery is always charged. However, since the present invention may adjust the charging of the battery in various manners based on the failure cause of the battery, the output voltage of the low-voltage DC-DC converter need not be maintained to be a high value. Therefore, it may be possible to prevent the power of the electric load from being excessively consumed due to the high output voltage, and to thereby improve vehicle fuel efficiency.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The exemplary embodiments of the present invention will be described below with reference to the accompanying drawings.

Figure 1:
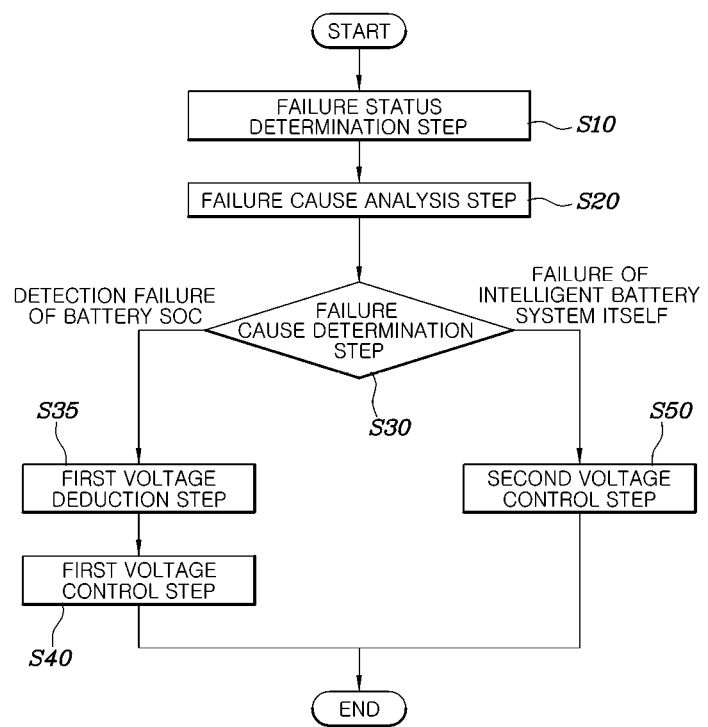
FIG. 1 is a flowchart illustrating a method of controlling a low-voltage DC-DC converter for a hybrid vehicle according to an exemplary embodiment of the present invention.
Figure 2:
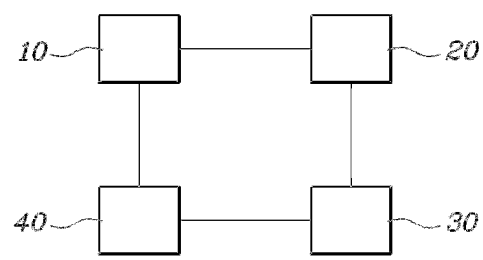
FIG. 2 is a diagram illustrating the configuration of a low-voltage DC-DC converter system for a hybrid vehicle according to an exemplary embodiment of the present invention.

As illustrated in FIG. 1, a method of controlling a low-voltage DC-DC converter for a hybrid vehicle according to an exemplary embodiment of the present invention may include determining, by a controller, whether an intelligent battery system (IBS) 30 fails (S10), and analyzing, by the controller, a failure cause of the intelligent battery system 30 (S20) when the intelligent battery system 30 is determined to fail.

As disclosed in the background of the present invention, there are many conventional techniques related to a control method of improving the efficiency of a hybrid vehicle by differently applying the output voltage of a low-voltage DC-DC converter according to the state of charge of a battery. However, there is no technique related to a method of analyzing failure causes when a vehicle is abnormal and adjusting the output voltage of a low-voltage DC-DC converter 10 based on the analyzed result, as in the present invention. Accordingly, to accomplish the object of the present invention, the present invention first performs the determination of whether the intelligent battery system 30 fails by the controller 40.

Particularly, the intelligent battery system 30 is a system configured to detect the general state of a vehicle battery 20, and typically may be configured to detect the current, voltage, temperature, and SOC (State Of Charge) of the battery 20. In recent years, the intelligent battery system 30 has been mounted within hybrid vehicles. The controller 40 may be configured to receive the state information of the battery 20 detected by the intelligent battery system 30 and determine the output voltage of the low-voltage DC-DC converter 10. Accordingly, the intelligent battery system 30 may be configured to transfer important factors for determining the output voltage of the low-voltage DC-DC converter 10. Therefore, the present invention first performs the determination of whether the intelligent battery system 30 fails, prior to determining the output voltage of the low-voltage DC-DC converter 10.

When the intelligent battery system 30 is determined to be abnormal (S10), the state information of the battery 20 transferred to the controller 40 from the intelligent battery system 30 may be considered erroneous information. However, all types of information transferred from the intelligent battery system 30 may not be erroneous, but only a portion of information regarding the state of the battery 20 may be erroneous information, based on the circumstances. Thus, it may be inefficient to adjust the output voltage of the low-voltage DC-DC converter 10 by determining that the intelligent battery system 30 fails. In particular, the SOC information of the battery 20, which is associated with whether the battery 20 is charged, may be erroneous.

Accordingly, the present invention includes analyzing the failure cause of the intelligent battery system 30 by the controller 40 after determining whether the intelligent battery system 30 fails (e.g., determines the reasoning for the malfunction or failure of the battery system). In other words, to accomplish the object of the present invention, the present invention may provide the foundation for variably adjusting the low-voltage DC-DC converter 10 based on the failure cause of the vehicle. Additionally, to analyze failure causes, various methods may be used based on types and states of vehicles.

A variety of failure causes may be considered in the analysis of the failure cause. As described above, the detection failure of SOC of the battery 20 is an important failure cause of the intelligent battery system 30 in adjusting the output voltage of the low-voltage DC-DC converter 10. The detection failure of SOC of the battery 20 may occur due to various reasons. In the present invention, for example, the detection failure of SOC of the battery 20 may occur due to the poor fastening (e.g., insufficient connection) of the terminal of the battery 20 and the excessive dark current in the battery 20.

Particularly, the poor fastening of the terminal of the battery 20 indicates a hardware failure. Thus, it may be impossible for the intelligent battery system 30 to detect the SOC of the battery 20, resulting in the detection failure of SOC of the battery 20. Further, the excessive dark current in the battery 20 may occur due to a software problem. Thus, a current excessively flows to the battery 20 when the vehicle is stopped, with the consequence that it may be impossible to detect the SOC of the battery 20 when starting the vehicle next time.

Accordingly, FIG. 1 illustrates the method of controlling the output voltage of the low-voltage DC-DC converter 10 when the intelligent battery system 30 is determined to fail due to the detection failure of SOC of the battery 20. As illustrated in FIG. 1, when the intelligent battery system 30 is determined to fail due to the detection failure of SOC of the battery 20 in a failure cause determination (S30), the present invention may include deducing a first voltage using the temperature of the battery 20 by the controller 40 (S35) and a adjusting the output voltage of the low-voltage DC-DC converter 10 to be the deduced first voltage by the controller 40 (S40).

When the intelligent battery system 30 is determined to fail due to the detection failure of SOC of the battery 20, the information about regarding states of the battery 20 (e.g., the current, voltage, and temperature of the battery 20) detected by the intelligent battery system 30 may be normal (e.g., without error). In other words, the output voltage of the low-voltage DC-DC converter 10 may be determined using the state information. In particular, the present invention thus may determine the output voltage of the low-voltage DC-DC converter 10 using the temperature of the battery 20 by the controller 40.

When the intelligent battery system 30 is determined to fail due to the detection failure of SOC of the battery 20, the first voltage, which is the output voltage of the low-voltage DC-DC converter 10, may be deduced by various methods as well as using the temperature of the battery 20. For example, the present invention proposes the method of deducing the first voltage using map data in which the temperature of the battery 20 is set as input and the first voltage is set as output.

Accordingly, the present invention may variably adjust the output voltage of the low-voltage DC-DC converter 10 using the temperature of the battery 20 detected by the intelligent battery system 30 even in the detection failure of SOC of the battery 20. Therefore, it may be possible to improve vehicle fuel efficiency since the charging voltage of the battery 20 may be adjusted based on the state of the battery 20, unlike convention techniques for providing high output voltage in general.

Further, it may be determined that the intelligent battery system 30 itself fails in the failure cause determination (S30). Unlike the above case, in this case, it may be difficult to place reliance on all types of state information of the battery 20 detected by the intelligent battery system 30. As proposed in the present invention, the failure of the intelligent battery system 30 itself is a typical example. Particularly, it may be impossible to variably adjust the output voltage of the low-voltage DC-DC converter 10 according to the state of the battery 20 since the usable state information of the battery 20 is not present. Accordingly, to stably drive the vehicle, instead of improving fuel efficiency through the variable control of charging voltage, the present invention unavoidably performs adjustment of the output voltage of the low-voltage DC-DC converter 10 such that the output voltage is a predetermined second voltage (S50), as illustrated in FIG. 1.

Particularly, the second voltage may be greater than the rated voltage of the battery 20 since the battery 20 may be charged through the low-voltage DC-DC converter 10 when the second voltage is greater than the rated voltage of the battery 20. In particular, vehicle stability takes precedence over vehicle fuel efficiency. Therefore, the output voltage of the low-voltage DC-DC converter 10 may be adjusted to be the second voltage, greater than the rated voltage of the battery 20, to at least prevent the battery 20 from being discharged when it is impossible to detect the state of the battery 20.

In the detection failure of SOC of the battery 20 described above, the first voltage has been described to be deduced using the temperature of the battery 20 by the controller 40. However, factors for determining the output voltage of the low-voltage DC-DC converter 10 may be added to adjust charging voltage which is more adapted to the driving state of the vehicle. The present invention proposes the output power of the low-voltage DC-DC converter 10 as an additional factor.

In other words, when the intelligent battery system 30 is determined to fail due to the detection failure of SOC of the battery 20, the controller 40 may be configured to determine a third voltage using the temperature of the battery 20 and the output power of the low-voltage DC-DC converter 10, and adjust the output voltage of the low-voltage DC-DC converter 10 to be the third voltage. The third voltage in the present invention may be deduced using map data in which the temperature of the battery 20 and the output power of the low-voltage DC-DC converter 1 are set as input and the third voltage is set as output.

A low-voltage DC-DC converter system for a hybrid vehicle according to an exemplary embodiment of the present invention may include a battery 20, a low-voltage DC-DC converter 10 configured to output the charging voltage of the battery 20, an intelligent battery system 30 configured to detect the state information of the battery 20, and a controller 40 configured to determine whether the intelligent battery system 30 fails, analyze the failure cause of the intelligent battery system 30 when the intelligent battery system 30 is determined to fail, and determine a first voltage using the temperature of the battery 20 to adjust the first voltage to be the output voltage of the low-voltage DC-DC converter 10 when the failure cause is determined to be the detection failure of SOC of the battery 20. The temperature of the battery 20 may be detected by the intelligent battery system 30.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of controlling a low-voltage direct current-direct current (DC-DC) converter for a hybrid vehicle, comprising:

determining, by a controller, whether an intelligent battery system fails;
analyzing, by the controller, a failure cause of the intelligent battery system when the intelligent battery system is determined to fail;
deducing, by the controller, a first voltage using a battery temperature when the failure cause is determined to be a detection failure of battery state of charge (SOC); and
adjusting, by the controller, an output voltage of a low-voltage DC-DC converter to be the first voltage,
wherein the intelligent battery system is configured to detect the state of the vehicle battery, a current, a voltage, a temperature, and a state of charge (SOC) of the battery.

2. The method according to claim 1, wherein the first voltage is deduced using map data in which the battery temperature is set as input and the first voltage is set as output.

3. The method according to claim 1, further comprising, after analyzing a failure cause, determining, by the controller, that the failure cause is the detection failure of battery SOC when the intelligent battery system is determined to fail due to poor connection of a battery terminal.

4. The method according to claim 1, further comprising, after analyzing a failure cause, determining, by the controller, that the failure cause is the detection failure of battery SOC when the intelligent battery system is determined to fail due to an excessive dark current in a battery.

5. The method according to claim 1, further comprising after analyzing a failure cause:
determining, by the controller, that the failure cause is the detection failure of battery SOC when the intelligent battery system is determined to fail due to impossibility of transmission of detected state information of a battery; and
adjusting, by the controller, the output voltage of the low-voltage DC-DC converter to be a predetermined second voltage when it is determined that the intelligent battery system fails.

6. The method according to claim 5, wherein the second voltage is greater than a rated voltage of the battery.

7. The method according to claim 5, further comprising after the analyzing a failure cause:
deducing, by the controller, a third voltage using the battery temperature and output power of the low-voltage DC-DC converter when the failure cause is determined to be the detection failure of battery SOC; and
adjusting, by the controller, the output voltage of the low-voltage DC-DC converter to be the third voltage.

8. The method according to claim 7, wherein the third voltage is deduced using map data in which the battery temperature and the output power of the low-voltage DC-DC converter are set as input and the third voltage is set as output.

9. A low-voltage DC-DC converter system for a hybrid vehicle, comprising:
a battery;
a low-voltage DC-DC converter configured to output a charging voltage of the battery;
an intelligent battery system configured to detect the state of the vehicle battery, a current, a voltage, a temperature, and a state of charge (SOC) of the battery; and
a controller configured to determine whether the intelligent battery system fails, to analyze a failure cause of the intelligent battery system when the intelligent battery system is determined to fail, and to deduce a first voltage using a battery temperature to adjust the first voltage to be an output voltage of the low-voltage DC-DC converter when the failure cause is determined to be a detection failure of battery SOC.

10. The low-voltage DC-DC converter system according to claim 9, wherein the battery temperature is detected by the intelligent battery system.

* * * * *